(12) United States Patent
Lesage et al.

(10) Patent No.: US 10,799,846 B2
(45) Date of Patent: Oct. 13, 2020

(54) ANCHORING STRUCTURE FOR AN ANTI-EROSION COATING, IN PARTICULAR FOR PROTECTING A WALL OF AN FCC UNIT

(71) Applicant: Total Raffinage Chimie, Courbevoie (FR)

(72) Inventors: Romain Lesage, Antwerp (BE); Hubert Simon, Le Havre (FR)

(73) Assignee: TOTAL RAFFINAGE CHIMIE, Courbevoie (FR)

( * ) Notice: Subject to any disclaimer, the term of this patent is extended or adjusted under 35 U.S.C. 154(b) by 0 days.

(21) Appl. No.: 16/496,850

(22) PCT Filed: Mar. 22, 2018

(86) PCT No.: PCT/EP2018/057346
§ 371 (c)(1),
(2) Date: Sep. 23, 2019

(87) PCT Pub. No.: WO2018/172478
PCT Pub. Date: Sep. 27, 2018

(65) Prior Publication Data
US 2020/0078762 A1   Mar. 12, 2020

(30) Foreign Application Priority Data
Mar. 24, 2017   (FR) .................... 17 52493

(51) Int. Cl.
*B01J 19/02* (2006.01)
*B01J 8/18* (2006.01)
*C10G 11/18* (2006.01)

(52) U.S. Cl.
CPC ............ *B01J 19/02* (2013.01); *B01J 8/1872* (2013.01); *B01J 2208/00884* (2013.01); *B01J 2219/0236* (2013.01); *C10G 11/18* (2013.01)

(58) Field of Classification Search
CPC .. B01J 19/02; B01J 8/1872; B01J 2219/0236; C10G 11/18; B32B 3/12; F27D 1/141; F23M 5/04
See application file for complete search history.

(56) References Cited

U.S. PATENT DOCUMENTS

| 3,033,086 A * | 5/1962 | Marsden ................. E01C 11/16 404/134 |
| 2013/0108519 A1* | 5/2013 | Sandacz ................. C10G 11/18 422/239 |

(Continued)

FOREIGN PATENT DOCUMENTS

| EP | 0180553 A1 | 5/1986 |
| WO | 2014009625 A1 | 1/2014 |
| WO | 2016071305 A1 | 5/2016 |

OTHER PUBLICATIONS

International Search Report issued in Application No. PCT/EP2018/057346, dated Jun. 14, 2018, 7 pages.

*Primary Examiner* — Lessanework Seifu
(74) *Attorney, Agent, or Firm* — Albert Shung

(57) ABSTRACT

A honeycomb metal anchoring structure, as described herein, is formed from a plurality of strips assembled in pairs so as to define a plurality of cells. Each strip is divided along its length into a plurality of portions, including at least one series of planar assembly portions juxtaposed and assembled with a series of assembly portions of an adjacent strip by fastening means, each strip having a lower longitudinal edge intended to be applied against a wall to be protected and an upper longitudinal edge opposite the lower longitudinal edge. The anchoring structure additionally comprises a plurality of protective tabs connecting each pair of juxtaposed assembly portions each protective tab being attached (Continued)

to an assembly portion by a longitudinal join line and extending in the direction of the juxtaposed assembly portion, at least up thereto.

16 Claims, 3 Drawing Sheets

(56) References Cited

U.S. PATENT DOCUMENTS

2015/0147236 A1\* 5/2015 Simon ..................... B32B 3/12
422/143
2015/0267122 A1 9/2015 Hinson et al.

\* cited by examiner

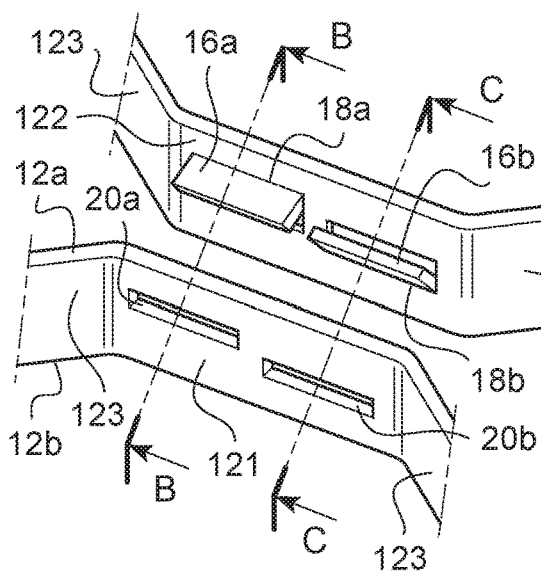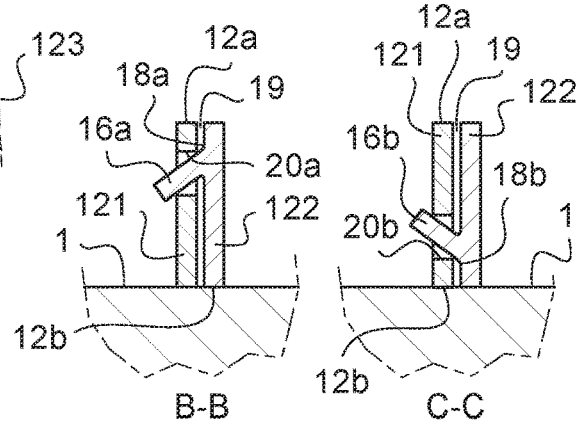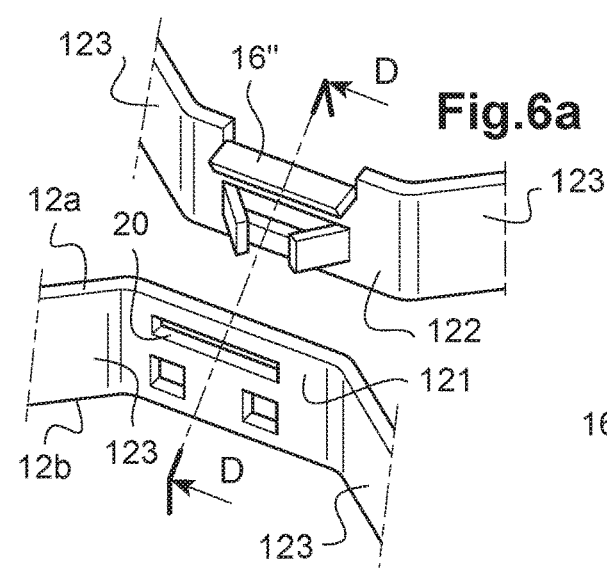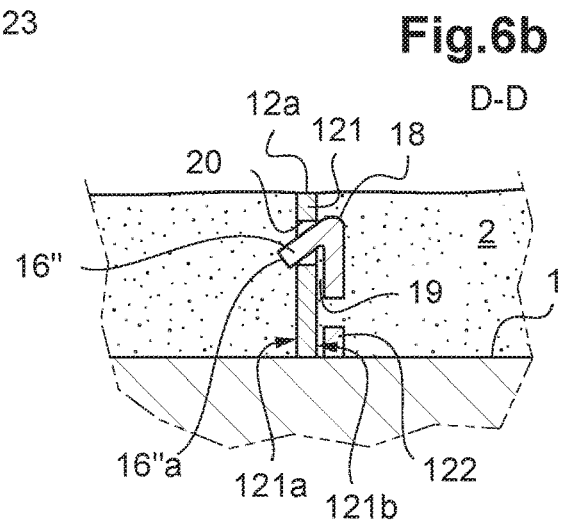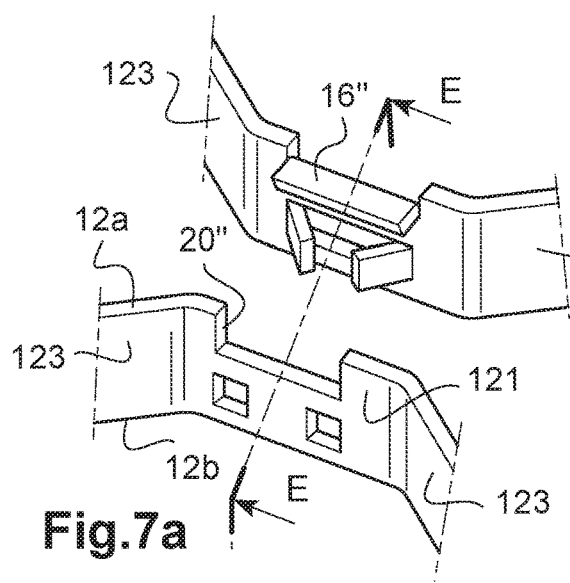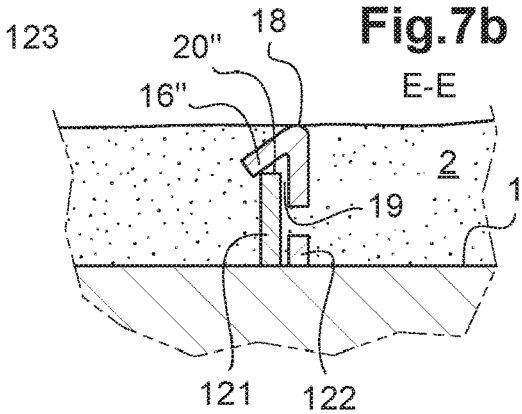

ANCHORING STRUCTURE FOR AN ANTI-EROSION COATING, IN PARTICULAR FOR PROTECTING A WALL OF AN FCC UNIT

CROSS-REFERENCE TO RELATED APPLICATIONS

This application claims the benefit of PCT/EP2018/057346 filed Mar. 22, 2018, which claims priority from FR 1752493 filed Mar. 24, 2017, which are incorporated herein by reference in their entireties for all purposes.

The invention relates to an anchoring structure for an erosion-resistant coating. Such a coating is more particularly intended to protect an inner or outer wall of a chamber of a fluid catalytic cracking (FCC) unit.

The invention is particularly suitable for protecting a wall of a region where there is a risk of erosion due to the circulation of catalyst, such as a cyclone wall, reactor plenum wall, stripper wall, riser wall, downer wall, the walls of standpipes (vertical pipes), disengager or withdrawal well walls, the walls of orifice chambers, or any other wall subject to erosion.

Fluidized-bed catalytic cracking (FCC) is a chemical process frequently used in oil refineries, the purpose of which is to convert heavy cuts comprising long hydrocarbon chains, for example resulting from the vacuum distillation of oil, into lighter and more upgradeable cuts. The metal walls of the various chambers of an FCC unit, such as for example a reactor and a regenerator, and the metal walls of the internal equipment located in the regenerator or the reactor, in particular the cyclones, or the walls mentioned above, may undergo erosion due to the circulation of the catalyst particles, and, in the regenerator, significant and rapid corrosion by the combustion gases. It is therefore necessary to protect them in order to lengthen their service life.

For this purpose, the metal walls are covered with a protective coating. Such coatings generally consist of a composite material, for example a concrete, held by an anchoring structure, which is usually metallic. These anchoring structures are firstly welded to the metal walls, then the cells filled with composite material, the anchoring structure ensuring the attachment of the latter. The cellular anchoring structures are generally formed of strips assembled in pairs, so as to define cells. Portions of strips are thus juxtaposed in assembly regions of the structure.

Over time, a degradation of this coating is observed which may lead to fragments of coating dropping inside the chambers or the internal equipment and require the shutdown of the plant in order to replace the coating.

The degradations observed may have several causes depending on the operating conditions of the chamber in question.

The reactor or the cyclones and separator located in the reactor, or else the transfer line of the products exiting from the reactor, are in contact with the gases resulting from the cracking of the feedstock. These gases get between the interstices of the coating and lead to the formation of coke inside these interstices, and more particularly at the junction of the strips of the anchoring structure. This formation of coke may lead to a significant detachment of the coating during successive cooling/heating cycles of the chamber resulting from intentional or unintentional shutdowns/restarts of the unit: this is because the gaps that exist between the composite material and its anchoring structure are filled in by the coke so that these shrinkage gaps can no longer fulfil their role, which consists in absorbing the differences in expansion between the anchoring structure and the composite material. This results in the formation of compression lines, cracks, failure of the welding bead, or even detachment of the composite material filling the cells. In particular, the gas penetrates via the cracks and reaches the welding bead, which can result in failure of the latter.

In a regenerator or in the internal equipment of a regenerator, in particular the cyclones, but also in the line of the flue gases at the outlet of the regenerator, or else in the orifice chambers, the metal walls are in contact with catalyst particles and with a gas containing, inter alia, oxygen and oxides of carbon, sulphur and nitrogen. This gas penetrates through the interstices of the coating and causes sulphidation, carburization and oxidation phenomena, in particular at the welds which fasten the metal anchoring structure to the metal walls, which phenomena can be propagated throughout the metal anchoring.

Irrespective of the degradation phenomena observed, corrosion, especially by sulphidation, carburization or oxidation, or formation of coke, the applicant has observed that these phenomena essentially occur at the metal anchoring structure and/or its bonding via welding to the metal walls, and more particularly at the juxtaposed strip portions of the anchoring structure. In particular, without wishing to be tied to one theory, it would appear that the diffusion of gas at these junctions as far as the metal wall plays a role in the degradation phenomena observed.

Document W)2014/009625A1, filed by the applicant, describes a process for producing a coating in which an anchoring structure having hexagonal cells is welded to the wall, at least at the junctions between the juxtaposed portions of the strips forming the anchoring structure. In addition, the composite material completely covers one of the juxtaposed portions of lower height. This makes it possible to limit the introduction and the progression of gaseous species between the juxtaposed portions, and to thus limit the degradation of the coating. This solution gives good results, but the welding may prove difficult to carry out.

Document WO2016/071305A1, also filed by the applicant, proposes to cover the anchoring structure with composite material up to the height of a tab provided on the portions of the strips between the juxtaposed portions, so that the upper edge of the juxtaposed portions is entirely covered with composite material, limiting the diffusion of gas at the juxtaposed portions of the anchoring structure. However, in operation, detachment of fragments of the composite material is observed.

There is thus a need to improve the resistance of a coating faced with degradation phenomena, in particular with corrosion, especially by sulphidation, carburization or oxidation, or formation of coke.

For this purpose, one subject of the invention relates to a honeycomb metal anchoring structure, said anchoring structure being formed from a plurality of strips assembled in pairs so as to define a plurality of cells, in particular hexagonal cells, between two adjacent strips, in which each strip is divided along its length into a plurality of portions, including at least one series of planar assembly portions juxtaposed and assembled with a series of assembly portions of an adjacent strip by fastening means, each strip having a lower longitudinal edge intended to be applied against a wall to be protected and an upper longitudinal edge opposite the lower longitudinal edge.

According to the invention, the anchoring structure additionally comprises a plurality of protective tabs connecting each pair of juxtaposed assembly portions, each protective tab being attached to an assembly portion by a longitudinal join line and each protective tab extending in the direction of the juxtaposed assembly portion, at least up thereto.

Thus, each protective tab extends through the joining zone separating two juxtaposed assembly portions, in particular over the entire distance that may separate these assembly portions. In particular, each protective tab may be inclined relative to the planes of juxtaposed assembly portions.

Through this arrangement, the protective tabs form barriers capable of disrupting the diffusion of the corrosive species between the assembled juxtaposed portions.

The anchoring structure according to the invention may additionally have one or more of the following features:

A single protective tab connects two juxtaposed assembly portions or at least two protective tabs connect two juxtaposed assembly portions. A single protective tab per pair of juxtaposed assembly portions may facilitate their production whereas two or more protective tabs may facilitate the shaping of the anchoring structure, for example by rolling.

Each pair of juxtaposed assembly portions has one or more protective tabs extending over at least 50% of the length of said assembly portions. This makes it is possible to reduce the possible diffusion of corrosive species between the assembly portions. Advantageously, the total length of the protective tab(s) may represent at least 60%, or even at least 70%, more preferentially at least 80% of the length of the assembly portions, or even at least 90% or 95% of the length of the assembly portions.

Each protective tab is formed from a part of the assembly portion folded out along the join line in the direction of the juxtaposed assembly portion. Each protective tab may thus be produced in a simple manner, by cutting, stamping or the like. In particular, each protective tab may be formed from a part of the assembly portion extending to the upper longitudinal edge thereof. The upper longitudinal edge of each assembly portion bearing said at least one protective tab may then extend parallel to the lower longitudinal edge, in the extension of the join line of said at least one protective tab. This upper longitudinal edge is then closer to the lower longitudinal edge than the upper longitudinal edge of the portions of the strip that are adjacent to an assembly portion. This closer upper longitudinal edge may nevertheless extend over the adjacent strip portions: the upper longitudinal edge of strip portions adjacent to an assembly portion bearing said at least one protective tab then extends parallel to the lower longitudinal edge, in the extension of the join line in the immediate vicinity of said assembly portion.

Each protective tab extends to the juxtaposed assembly portion and beyond this portion, this juxtaposed assembly portion having a recess for the passage of each protective tab. A recess thus enables a protective tab to pass through the juxtaposed assembly portion or above the upper longitudinal edge thereof. In particular, this recess may be located at a distance from the lower longitudinal edge and extend to the upper longitudinal edge or to a predetermined distance from said upper longitudinal edge. In other words, the recess may form a simple cutout over the upper longitudinal edge or an orifice passing through the strip. One end of each protective tab opposite its join line may furthermore be folded out in the direction of one face of the juxtaposed assembly portion opposite the face located facing the assembly portion attached to the protective tab. The protective tabs may then form fastening means.

The protective tabs constitute the fastening means of the assembly portions.

The assembly portions have different fastening means from the protective tabs. In this case, the protective tabs are then located between the fastening means and the upper longitudinal edge of an assembly portion. Although separate fasting means are provided, the protective tabs may participate in the assembling of the strips.

The juxtaposed assembly portions are assembled by at least one welding bead along their edges perpendicular to the longitudinal direction of a strip. This may make it possible to limit the diffusion of gas between the juxtaposed assembly portions. It is possible in particular to provide a welding bead that extends over the entire height of a strip, or a welding bead immediately adjacent to the lower longitudinal edge or to the upper longitudinal edge, or else two welding beads, one of which is immediately adjacent to the lower longitudinal edge and the other immediately adjacent to the upper longitudinal edge.

The invention also relates to an erosion-resistant coating characterized in that it comprises an anchoring structure according to the invention embedded in a composite material, for example a concrete, the composite material filling each cell from the lower longitudinal edge of each strip at least to the upper longitudinal edge. Advantageously, the composite material extends beyond the upper longitudinal edge of at least one strip, in particular in the assembly portions, thus further limiting the penetration of gas between the juxtaposed assembly portions.

The invention finally relates to a chamber of a fluid catalytic cracking unit characterized in that it comprises at least one inner or outer wall covered with at least one coating according to the invention, the lower longitudinal edge of each strip of the anchoring structure of the coating being fastened by welding to the inner or outer wall of the chamber. This chamber may in particular be a chamber of a cyclone, of a regenerator, of a disengager or of any other internal equipment of a fluid catalytic cracking unit that has to be protected.

The invention is now described with reference to the appended, non-limiting drawings, in which:

FIGS. 5a, 6a, 7a are partial representations, in perspective, of anchoring structures according to other embodiments of the invention, before assembling of adjacent strips;

FIGS. 5b and 5c are cross-sectional views along the lines B-B and C-C respectively from FIG. 5a, after assembling of the strips, fastening to a wall and before installing the composite material;

FIGS. 6b and 7b are cross-sectional views along the lines D-D and E-E respectively from FIGS. 6a and 7a, after assembling of the strips, fastening to a wall and after installing the composite material;

Figure 1:
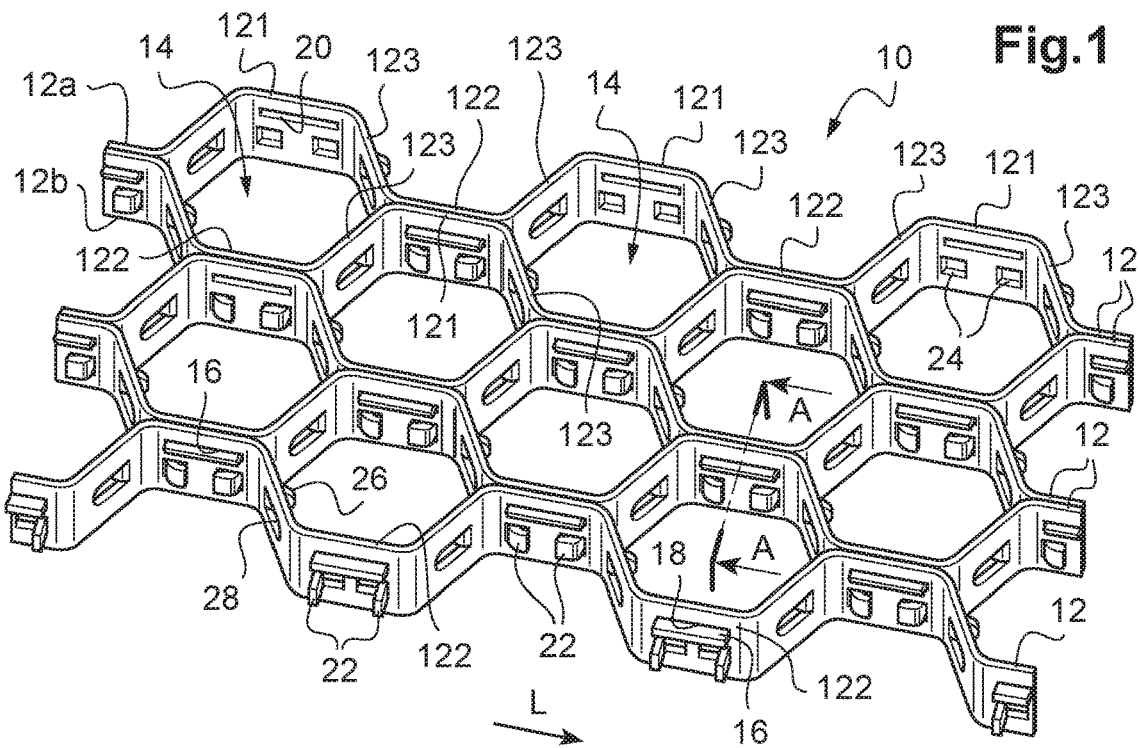
FIG. 1 is a representation, in perspective, of an anchoring structure according to one embodiment of the invention.

FIG. 1 represents a metal anchoring structure 10 of honeycomb type formed from a plurality of strips 12 assembled in pairs so as to form a plurality of cells 14. The cells 14 are here of hexagonal shape and are connected by their sides to one another. Such a hexagonal shape of the cells makes it possible to produce a particularly strong anchoring structure. Moreover, the assembling of two strips makes it possible to obtain a plurality of cells.

A strip is understood to mean a strip of metal material having a width smaller than a length and a thickness smaller than the width. In the present description, the length of an element is defined along the longitudinal direction of a strip.

By way of example, the internal dimensions of the cells may vary from 4 to 8 cm per side for a thickness (height) of around 1.5 to 3.0 cm, for example 2 cm.

Each strip 12 is divided along its length into a plurality of portions, including at least one series of planar assembly portions 121, 122 juxtaposed and assembled with a series of assembly portions 122, 121 of an adjacent strip by fastening means. In this embodiment, each strip 12, made from one piece, is divided along its length into a plurality of portions 121, 122, 123:
- first strip portions 121 that extend in a first plane parallel to the longitudinal direction L of the strip,
- second strip portions 122 that extend in a second plane parallel to the first plane and different therefrom,
- third strip portions 123 that each connect a first strip portion 121 to a second strip portion 122.

The portions 121, 122, 123 of a strip are therefore flat. Each strip may be produced by folding a flat strip along a line perpendicular to its longitudinal direction (L), in the plane of the strip. The various portions 121, 122 123 are thus separated by folds, perpendicular to the longitudinal direction (L).

The first strip portions 121 and second strip portions 122 are thus alternated (according to the pattern—121-123-122-123—repeated over the length of a strip) over the entire length of a strip 12 and the first portions 121 of one strip are juxtaposed and assembled with the second portions 122 of an adjacent strip 12 by fastening means. The first strip portions 121 and second strip portions 122 form portions for assembly to an adjacent strip 12. Juxtaposed portions are understood here to mean portions that are positioned parallel to one another and facing one another in a direction perpendicular to the planes of the juxtaposed portions.

Currently, the various specifications require a maximum gap of the order of 0.2 mm between two assembled juxtaposed strip portions. However, the invention is not limited to a specific gap.

Advantageously and non-limitingly, all the strips 12 of the anchoring structure may be identical, as represented here. This may make it possible to obtain an anchoring structure that has mechanical properties that are particularly uniform over its entire surface owing to the use of identical strips, so that the stresses generated by the shaping thereof will be homogeneous and so that the anchoring structure obtained will have a good deformability. The use of identical strips also makes it possible to reduce the production costs.

Each strip 12 has a first longitudinal edge 12a and a second longitudinal edge 12b parallel to the first longitudinal edge 12a. Generally, each longitudinal edge defines at least one plane before shaping of the anchoring structure for the application thereof to a wall to be protected. Preferably, the longitudinal edges of the strip are parallel before this shaping.

In this embodiment, the first and second longitudinal edges each extend in a single plane before the shaping of the anchoring structure. The second longitudinal edge 12b is here the edge intended to be applied against a metal wall 1 and fastened thereto, as represented in FIG. 3.

According to the invention, the anchoring structure 10 additionally comprises a plurality of protective tabs 16 connecting juxtaposed assembly portions 121, 122 of adjacent strips. Each protective tab 16 is attached to an assembly portion 122 of a strip 12 by a longitudinal join line 18 and extends in the direction of the juxtaposed assembly portion 121, at least up thereto. As a variant, each protective tab could be attached to an assembly portion 121 and extend in the direction of an assembly portion 122, or else protective tabs could be provided alternately on the portions 121 and 122 of one and the same strip.

Figure 2:
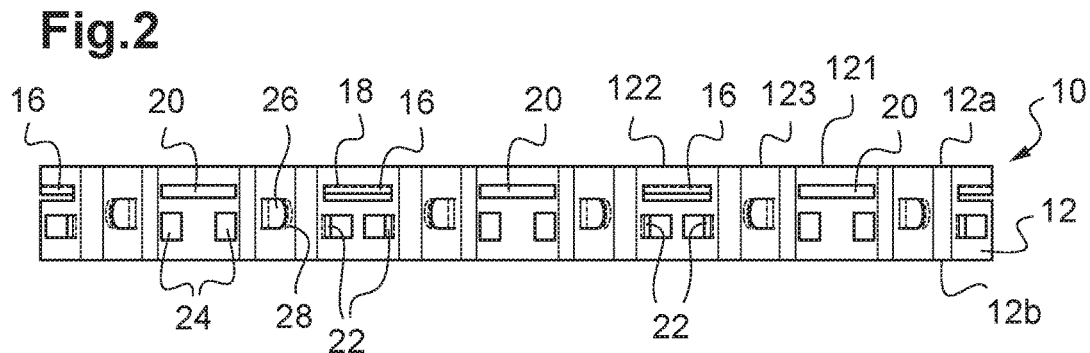
FIG. 2 represents a side view of the anchoring structure represented in FIG. 1.
Figure 3:
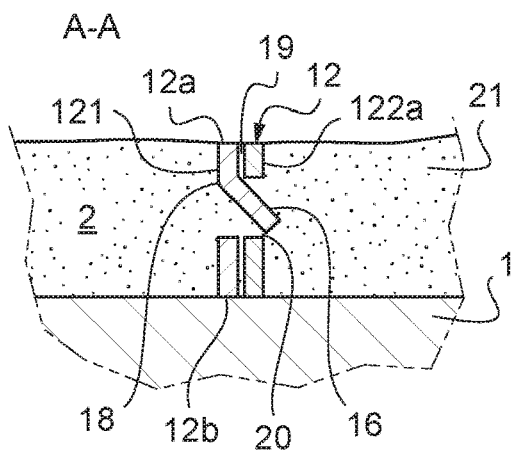
FIG. 3 is a cross-sectional view of the anchoring device along the line A-A from FIG. 1, the anchoring device being fastened to a wall and covered with composite material.

In the example represented in FIGS. 1-3, each protective tab 16 extends to the juxtaposed assembly portion 121 and beyond this portion (see FIG. 3). Each protective tab 16 then passes through an orifice 20 of substantially corresponding shape made in the assembly portion 121 of the adjacent strip (see FIG. 3). The protective tabs 16 are moreover inclined in the direction of the lower longitudinal edge 12b. The protective tab 16 are here formed by cutting of the assembly portion 122 from which they are derived and are therefore folded relative to this assembly portion 122 along the join line 18. Each protective tab 16 is thus inclined relative to the planes of the assembly portions 121, 122 (see FIG. 3). In particular, each protective tab 16 defines a secant plane of the planes of the assembly portions 121, 122.

The protective tabs 16 thus extend across the space 19 separating two juxtaposed assembly portions 121, 122 (FIG. 3), thus limiting the diffusion of chemical species from the upper longitudinal edge 12a of the strips 12 between the portions 121, 122.

Figure 4:
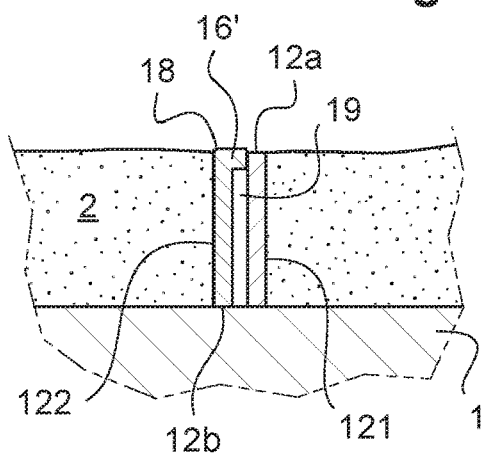
FIG. 4 is a cross-sectional view similar to that of FIG. 3 representing an anchoring structure according to another embodiment.

The invention is not however limited to this particular embodiment. As represented in FIG. 4, a protective tab 16' could extend on the side of the upper longitudinal edge 12a to the juxtaposed assembly portion 121 and abuts against this portion, thus closing the space 19 separating the assembly portions 121, 122 on the side opposite the lower longitudinal edge 12b. The protective tab 16' then substantially forms a right angle with the planes of the assembly portions 121, 122.

In the embodiment represented in FIGS. 5a, 5b, 5c, two protective tabs 16a, 16b are provided on one and the same assembly portion 122, each connected to the assembly portion 122 by a longitudinal join line 18a, 18b respectively. As in the embodiment represented in FIGS. 1-3, each protective tab 16a, 16b is formed from a part of the assembly portion 122 folded out along the join line 18a, 18b respectively, in the direction of the juxtaposed assembly portion 121. They may for example be formed by cutting or stamping. It will be noted that one of the protective tabs 16a is inclined in the direction of the upper longitudinal edge 12a (see FIG. 5b) whereas the other protective tab 16b is inclined in the direction of the lower longitudinal edge 12b. Each of the protective tabs 16a, 16b is inserted into a corresponding orifice 20a, 20b respectively, made in the juxtaposed assembly portion 121. In this embodiment, the protective tabs 16a, 16b also ensure the assembling of the assembly portions 121, 122, their opposite orientation favouring this assembling. It will be noted that the protective tabs 16a, 16b have the same dimensions and are located next to one another, the respective join lines 18a, 18b being offset perpendicular to the direction L, as are the orifices 20a, 20b.

In the embodiment represented in FIGS. 6a, 6b, a protective tab 16" of an assembly portion 122 is also formed from a part of the assembly portion folded out along the join line 18 in the direction of the juxtaposed assembly portion 121, but this part extends to the upper longitudinal edge 12a.

The folded-out protective tab 16" then passes through the corresponding orifice 20 of the adjacent assembly portion.

In the embodiment represented in FIGS. 7a, 7b, a protective tab 16" identical to the one represented in FIGS. 6a, 6b is produced. Instead of passing through an orifice 20 of the adjacent assembly portion 121, it passes over a recess 20" (see FIG. 7b), that is located at a distance from the lower longitudinal edge 12b and extends to the upper longitudinal edge 12a of the strip.

It will be noted that the composite material 2 completely covers the assembly portion 122 comprising the protective tab 16" in the embodiments from FIGS. 6b and 7b.

In the embodiments represented in FIGS. 1-3, 6a, 6b and 7a, 7b, fastening means different from the protective tabs are provided for assembling the pairs of juxtaposed assembly portions 121, 122. The protective tabs 16, 16" are then arranged between the fastening means and the upper longitudinal edge 12a of the strips, as is visible in these figures. The protective tabs are thus closer to the upper longitudinal edge 12a than to the lower longitudinal edge 12b.

Although they are different from the fastening means, the protective tabs 16, 16" may nevertheless participate in the fastening of the assembly portions. For this purpose, as represented in FIG. 6b, one end 16"a of the protective tab 16 opposite its join line 18 (that forms the upper longitudinal edge 12a before folding of the protective tab 16") is folded out in the direction of one face 121a of the juxtaposed assembly portion 121 opposite the face 121b located facing the assembly portion 122 attached to the protective tab 16". It may then be advantageous for the surface of the protective tabs 16, 16" to be greater than the surface of the orifice 20.

The fastening means of the assembly portions 121, 122 visible in FIGS. 1-3, 6a, 6b and 7a, 7b are now described with reference to FIGS. 1 and 2.

In the example represented, the fastening means of the strips 12 comprise two flaps 22 per second portion 122 formed by cutting through these second portions 122. These flaps 22 are connected to a second portion 122 by a joint line perpendicular to the upper 12a and lower 12b longitudinal edges. Here they are oriented towards one another (see FIG. 1). These flaps 22 are received in corresponding orifices 24 of the first portions 121. The fastening of the strips 12 is thus carried out very simply by introducing the flaps 22 of the second portions 122 into the corresponding orifices 24 of the first portions 121, then by folding the flaps 22 against these first portions 121 on their face opposite the face juxtaposed with the second portion 122 (see FIG. 1).

As a variant, a single flat 22 could be provided per second portion 122. The flaps 22 and the orifices 24 may be positioned either on the first or second strip portions 121, 122. However, in order to simplify the production of the strips, the flaps 22 are here provided on the same assembly portions 122 as the protective tabs 16, the orifices 24 being produced on the assembly portions 121 comprising the orifices 20 or the recesses 20" for receiving the protective tabs 16, 16".

Other fastening means could be envisaged, such as staples or rivets passing through corresponding orifices of the first and second portions.

As represented in FIG. 1, each strip 12 may additionally have flaps of material 26 cut out in at least one portion other than an assembly portion (namely here a portion 123) and folded in order to jut out from this portion along a fold line perpendicular to the longitudinal direction of the strip. Such a configuration may make it possible to improve the anchoring of the composite material to the anchoring element, the flap 26 then being embedded in the composite material, the hold of which is also reinforced owing to the fact that it passes through the cutout orifice 28 freed by the folded out flap 26.

The flaps 26 of material resulting from portions that are part of one and the same cell may be folded out towards one another. This arrangement makes it possible to obtain two tabs folded out towards the centre of each cell when the strips are assembled with one another.

These flaps 26 may also be folded out so as to extend substantially parallel to the planes of the assembly portions 121, 122 of the strips.

Figure 8:
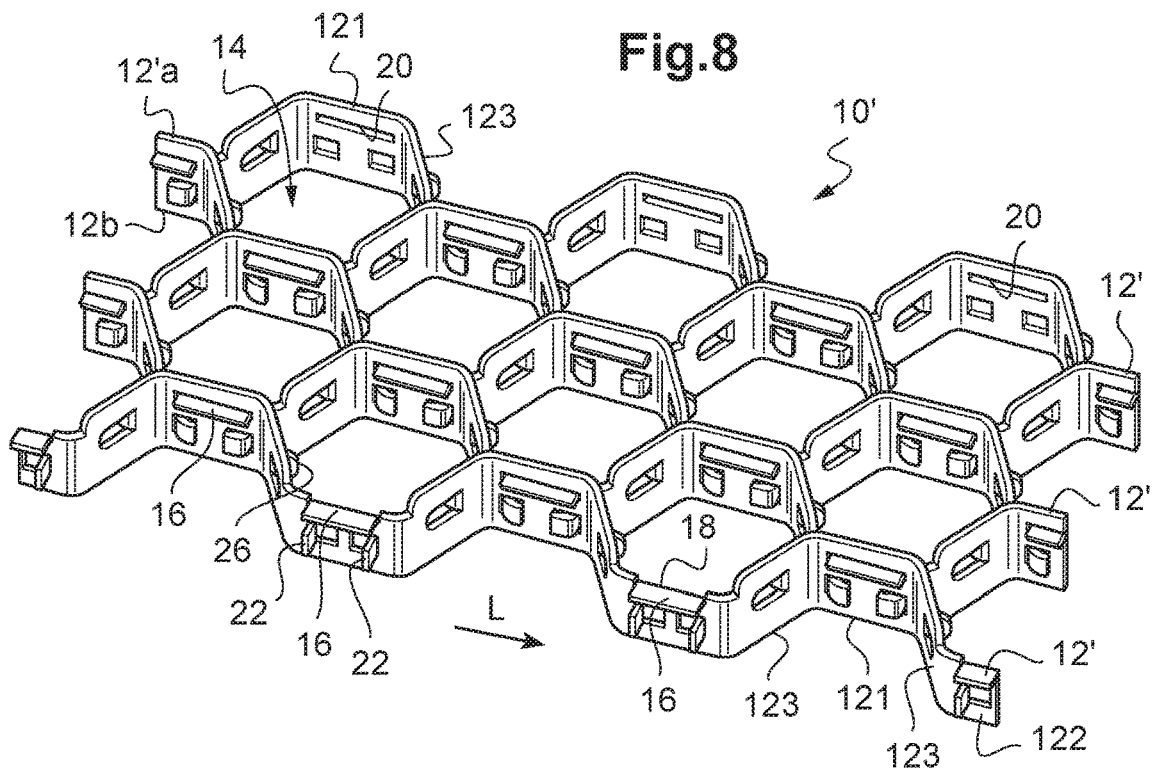
FIG. 8 is a representation, in perspective, of an anchoring structure according to another embodiment of the invention.
Figure 9:
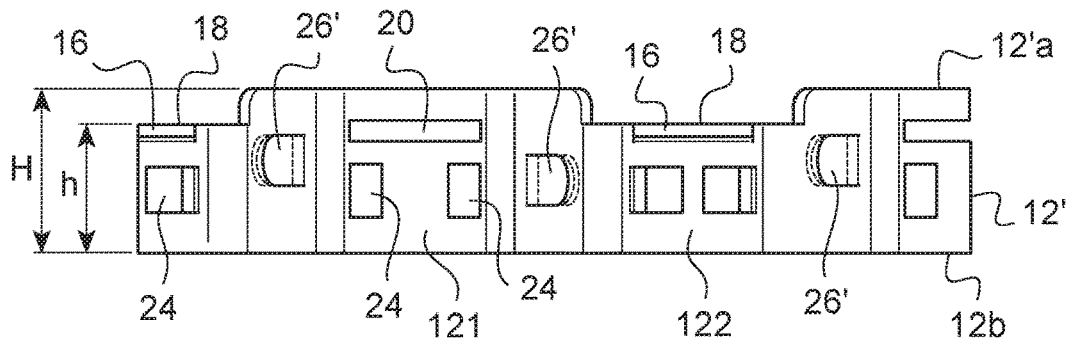
FIG. 9 represents a side view of the anchoring structure represented in FIG. 8.
Figure 10:
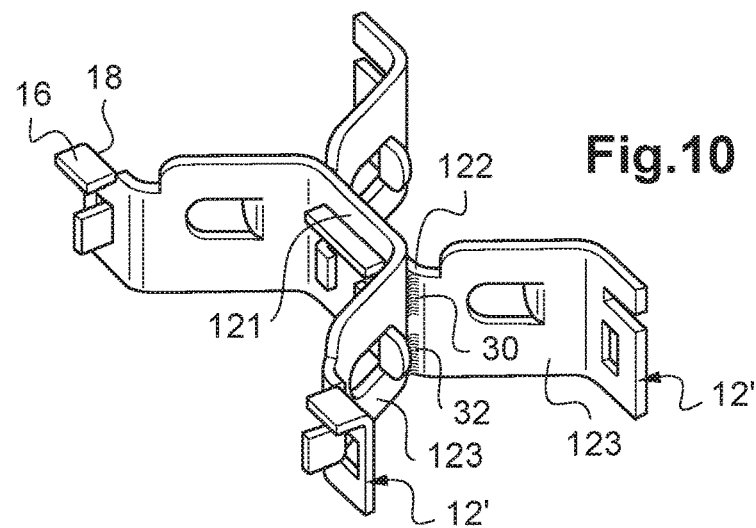
FIG. 10 is an enlarged view of a detail from FIG. 8.

FIGS. 8-10 represent an anchoring structure 10', the shape of which differs from the embodiment represented in FIGS. 1-3 only by the shape of the upper longitudinal edges 12'a of the strips 12' and the position of the flaps 26'. These flaps 26 are arranged at different distances from the lower longitudinal edge 12b from one portion 123 to another (see FIG. 9). The other elements represented in FIG. 8-10 are identical to those described with reference to FIGS. 1-3 and are denoted by the same numerical references.

In this embodiment, the upper longitudinal edge 12'a of each assembly portion 122 bearing the protective tab 16 extends parallel to the lower longitudinal edge 12b, in the extension of the join line 18 of the protective tab (16). Thus, in the assembly portion 122, the upper longitudinal edge 12'a extends at a distance h from the lower longitudinal edge 12b that is smaller than the distance H separating the upper longitudinal edge 12'a from the adjacent strip portions 123 (see FIG. 9). In other words, the upper longitudinal edge 12'a of one and same strip does not extend in a single and unique plane before shaping of the anchoring structure. In the embodiment represented, the upper longitudinal edge 12'a extends at the distance h from the lower longitudinal edge 12b over the entire length of the assembly portion 122 and also over a part of the adjacent strip portions 123. Thus, over this strip length, the composite material 2 may completely cover the upper longitudinal edge 12'a of height h, creating an additional barrier to the diffusion of gas between the juxtaposed assembly portions 121, 122.

In addition, as is visible in FIG. 10, welding beads 30, 32 extend along the edges of the juxtaposed assembly portions 121, 122 perpendicular to the longitudinal direction of a strip 12'. In other words, these welding beads extend perpendicular to the longitudinal direction of a strip 12' and at least partly close the access to the space separating the juxtaposed assembly portions 121, 122, further reducing the risks of diffusion of gas between these portions. It should be noted that only one of the welding beats 30 or 32 may be provided, or that a single welding bead that extends over the entire join height of the assembly portions may be provided. These welding beats may of course also be provided in the embodiment described with reference to FIGS. 1-3, irrespective of the shape and number of protective tabs.

The anchoring structure 10 represented in FIG. 1 may be shaped before the fastening thereof to the metal wall 1, for example by rolling in order to match the shape of this metal wall.

The anchoring structure 10 represented in FIG. 1 may be used in the following manner:

the anchoring structure 10 is firstly shaped; for this purpose, the second longitudinal edges 12b are shaped in order to be in contact with the metal wall 1, the anchoring structure 10 is then fastened to the metal wall 1 by welding the lower edge 12b of the strips thereto, next, a composite material 2 is inserted into the cells 14 of the anchoring structure 10 from the metal wall 1 and at least up to the first longitudinal edge 12a of each strip, as represented in FIG. 3.

Of course, this use also applies to the other embodiments of the anchoring structure described above, with which the embodiments of the protective tabs may be combined.

Irrespective of its shape, the honeycomb structure of the present invention is advantageously made of stainless steel (a stainless steel contains at most 1.2% by weight of carbon and at least 10.5% by weight of chromium according to the EN10008 standard). In particular, the stainless steel will be selected so as to withstand the environment of the chamber in which the anchoring structure must be used.

In some applications, for example as coating in regenerator cyclones, serious degradations of the stainless steel used for honeycomb structures have been observed.

It would appear that, under the external layer of chromium oxide, the chromium content of the steel decreases during use until a value of less than 10.5% by weight is reached. In point of fact, a steel loses its stainless nature when its chromium content is less than 10.5% by weight: rapid oxidation of the steel can then occur.

In addition, the formation of carbides has also been observed and appears to have been the cause of microcracks inside the steel.

In order to avoid or delimit this type of degradation, the strips of the anchoring structure may advantageously be made of austenitic stainless steel chosen from the following steels:

a stainless steel containing from 0.04 to 0.10% by weight of carbon, from 17 to 19% of chromium and from 9 to 12% of nickel, and with a niobium content of from 8 times the carbon content to 1% by weight, for example a steel of AISI 347 grade, a steel containing at most 0.015% by weight of carbon, from 15 to 17% of chromium and from 33 to 37% of nickel, for example a steel of AISI 330 grade, a steel containing at most 0.10% by weight of carbon, from 24 to 26% of chromium and from 19 to 22% of nickel, for example a steel of AISI 310 grade.

The composite material is preferably a material resulting from an assembly of at least two immiscible materials having a high adhesion capacity. Preferably, the composite material is a composite construction material such as a concrete, in particular a concrete suitable for use in a fluid catalytic cracking unit.

The invention claimed is:

1. A honeycomb metal anchoring structure comprising:
a plurality of strips assembled in pairs so as to define a plurality of cells between two adjacent strips, in which each strip is divided along its length into a plurality of portions, including at least one series of planar assembly portions juxtaposed and assembled with a series of assembly portions of an adjacent strip by fastening means, each strip having a lower longitudinal edge intended to be applied against a wall to be protected and an upper longitudinal edge opposite the lower longitudinal edge, wherein the fastening means comprises at least two flaps disposed on a first assembly portion which are received by at least two corresponding orifices on a second assembly portion,
characterized in that the honeycomb metal anchoring structure further comprises a plurality of protective tabs connecting each pair of juxtaposed assembly portions, each protective tab being attached to an assembly portion by a longitudinal join line and each protective tab extending in the direction of the juxtaposed assembly portion, at least up thereto.

2. The anchoring structure of claim 1, characterized in that a single protective tab connects two juxtaposed assembly portions.

3. The anchoring structure of claim 1, characterized in that at least two protective tabs connect two juxtaposed assembly portions.

4. The anchoring structure of claim 1, characterized in that each pair of juxtaposed assembly portions has one or more protective tabs extending over at least 50% of the length of said assembly portions.

5. The anchoring structure of claim 1, characterized in that each protective tab is formed from a part of the assembly portion folded out along the join line in the direction of the juxtaposed assembly portion.

6. The anchoring structure of claim 5, characterized in that each protective tab is formed from a part of the assembly portion extending to the upper longitudinal edge thereof.

7. The anchoring structure of claim 6, characterized in that the upper longitudinal edge of each assembly portion bearing said at least one protective tab extends parallel to the lower longitudinal edge, in the extension of the join line of said at least one protective tab.

8. The anchoring structure of claim 7, characterized in that the upper longitudinal edge of strip portions adjacent to an assembly portion bearing said at least one protective tab extends parallel to the lower longitudinal edge, in the extension of the join line in the immediate vicinity of said assembly portion.

9. The anchoring structure of claim 1, characterized in that each protective tab extends to the juxtaposed assembly portion and beyond this portion and in that this juxtaposed assembly portion has a recess for the passage of each protective tab.

10. The anchoring structure of claim 9, characterized in that the recess is located at a distance from the lower longitudinal edge and extends to the upper longitudinal edge or to a predetermined distance from said upper longitudinal edge.

11. The anchoring structure of claim 9, characterized in that one end of each protective tab opposite its join line is folded out in the direction of one face of the juxtaposed assembly portion opposite the face located facing the assembly portion attached to the protective tab.

12. The anchoring structure of claim 1, characterized in that the protective tabs constitute the fastening means of the assembly portions.

13. The anchoring structure of claim 1, characterized in that the assembly portions have different fastening means from the protective tabs, these tabs being located between the fastening means and the upper longitudinal edge of an assembly portion.

14. The anchoring structure of claim 1, characterized in that the juxtaposed assembly portions are assembled by at least one welding bead along their edges perpendicular to the longitudinal direction of a strip.

15. An erosion-resistant coating comprising the anchoring structure according to claim 1 embedded in a composite material, the composite material filling each cell from the lower longitudinal edge of each strip at least to the upper longitudinal edge.

16. A chamber of a fluid catalytic cracking unit comprising at least one inner or outer wall covered with at least one coating according to claim 15, the lower longitudinal edge of each strip of the anchoring structure of the coating being fastened by welding to the inner or outer wall of the chamber.

\* \* \* \* \*